Patented Dec. 30, 1941

2,267,770

UNITED STATES PATENT OFFICE 2,267,770

PROCESS FOR THE PRODUCTION OF DYEINGS

William H. von Glahn, Loudonville, N. Y., assignor to General Aniline & Film Corporation, a corporation of Delaware No Drawing. Application July 9, 1938, Serial No. 218,414. In Germany July 10, 1937

12 Claims. (Cl. 8—46)

The present invention relates to a new process for producing dyeings on fibrous material.

At the present time, several methods of applying azo dyestuffs to fibers are known. One consists in impregnating the fiber with an azo component, such as beta-naphthol, the Naphthol-AS- compounds, and the like, and subsequently developing the dyestuff by immersing the impregnated fiber in a bath containing a diazo compound. Another method, substantially the reverse of that described above, consists in applying a diazotizable substance to the fiber, subsequently diazotizing said substance on the fiber, and developing the dyestuff in a bath containing an azo component.

A third and more recent method is that of impregnating the fiber with a stabilized diazo compound and an azo component and subsequently forming the dye by treating the fiber with an acid to regenerate the free diazo which immediately couples with the azo component. It has also been suggested that the fiber may be treated with an aromatic base and a developer in one bath and diazotizing and coupling the two in a second bath, care being taken to avoid precipitation or separation of the bases, developers or dyestuffs by employing a protective colloid in at least one of the baths.

I have now found that excellent level dyeings may be obtained by impregnating or printing on the fiber substantially water-insoluble but alkali-soluble aromatic bases capable of being diazotized, together with an azo component, and developing the dyestuff on the fiber by subsequently immersing the fiber in a bath containing nitrous acid so as to diazotize the base and couple the diazo at the same time. As coupling compounds I may, for example, use the alkali-soluble naphthols, such as beta-naphthol and 2-hydroxy-naphthalene-3-carboxylic acid-arylamide. Compounds, such as beta-keto-carboxylic acid-arylamide, are also useful.

As alkali-soluble, water-insoluble amines I prefer to employ diazotizable aromatic bases containing one or more alkali-solubilizing groups, such as sulfamido-, hydroxy groups, enolic hydroxy groups, or the like.

Several types of the alkali-soluble but water-insoluble bases which are suitable for the present process are listed below:

(1) Amidoarylsulfonyl mono-alkyl- or aryl-amides, such as compounds of the formulae:

(a) 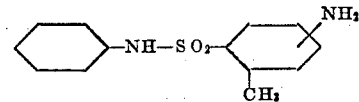

(b) 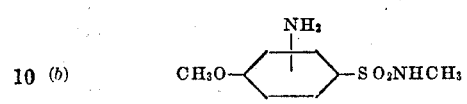

(c) 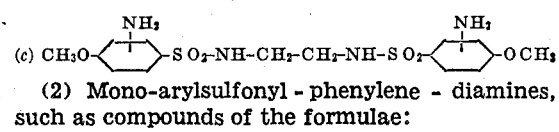

(2) Mono-arylsulfonyl - phenylene - diamines, such as compounds of the formulae:

(a) 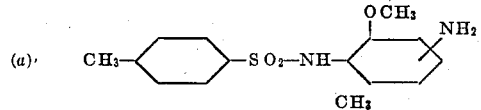

(b) 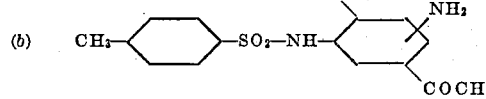

(c) 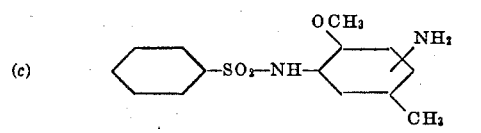

(3) Aromatic amines with an external sulfamid group, such as compounds of the formula:

(a) 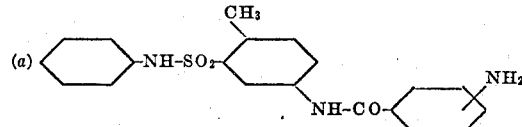

(b) 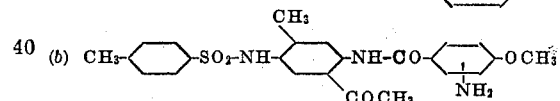

(c) 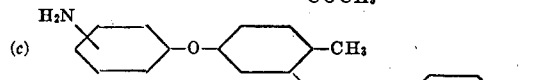

(d) 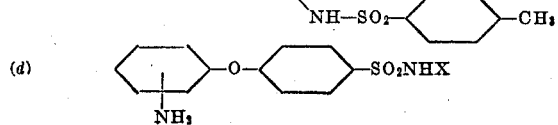

wherein X stands for H, alkyl or aryl (e) 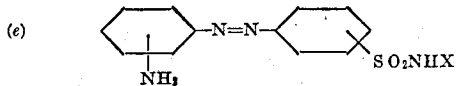

wherein X stands for H, alkyl or aryl, (f) 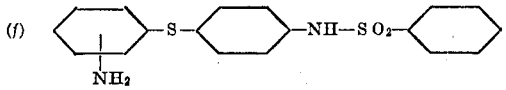

(4) Compounds having a phenolic hydroxy group attached to an aromatic nucleus, such as those of the formulae:

(a) Mono-hydroxyaroyl-phenylene-diamine

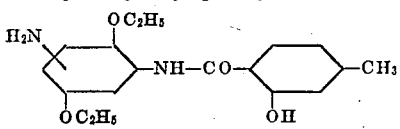

(b) Aminobenzoyl-aminophenol

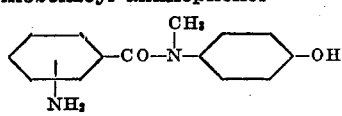

(c) Aminohydroxy-diphenylether

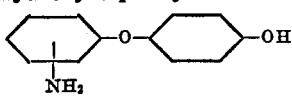

(5) Compounds having enolic hydroxy groups, such as:

(a) Mono-acetoacetyl-phenylene-diamine

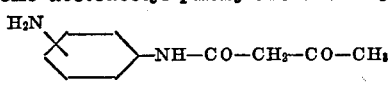

(b) Aminobenzoylacetic-acid-arylide

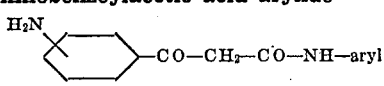

In practicing the present invention, the fiber may be treated with the base and the coupling component together with the nitrite, whereupon the fiber is subjected to an acid treatment to develop the dyestuff. It is also possible to treat the fiber with the two dyestuff components without the nitrite and subsequently subjecting the impregnated fiber to treatment in a bath of nitrous acid. The coupling action usually takes place simultaneously with the diazotization. It is often desirable to complete the coupling by partly or entirely neutralizing the acid or even finally rendering the bath alkaline; this may, for example, be effected by aftertreatment with basic reacting agents, such as ammonia vapor or alkaline solutions.

The following examples serve to illustrate the invention, but it is not intended to limit the invention specifically thereto:

*Example 1.*—1.33 grs. of 1-amino-4-methyl-3-sulfanilido benzene of the formula:

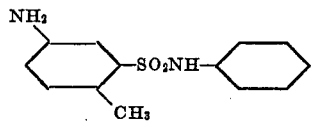

and 0.72 gr. of beta-naphthol are dissolved in 15 cc. of water, 1 cc. of monopol oil and 2 cc. of caustic soda solution of 40% by volume. This solution is then made up to 100 grams of printing paste, with a usual thickener. The paste is printed onto acetate silk, dried, exposed to steam for from ten to fifteen minutes and then immersed for from ten to fifteen minutes at room temperature in 500 cc. of water containing 3.5 grs. of sodium nitrite and 7 cc. of glacial acetic acid. The material is then washed and dried. A bright orange shade is obtained.

By carrying out the development at a temperature of from 70° to 80° C. instead of at room temperature, a full bright orange shade is obtained immediately.

*Example 2.*—1.33 grs. of 1-amino-4-methyl-3-sulfanilido benzene and 1.55 grs. of 2-hydroxy-3-(2'-ethoxybenzene) carbonylamido naphthalene are dissolved in 15 cc. of water, 1 cc. of monopol oil and 2 cc. of caustic soda solution of 40% by volume. 50 grs. of a neutral tragacanth thickener and enough water are added to the solution to make up 100 grams.

The paste is printed onto acetate silk, the printed silk is dried and then steamed for from ten to fifteen minutes. It is then immersed for from ten to fifteen minutes at room temperature in a bath containing 7 grs. of sodium nitrite and 14 grs. of glacial acetic acid per liter of water. The material is then washed and dried. A scarlet shade is obtained, the dyestuff having the following formula:

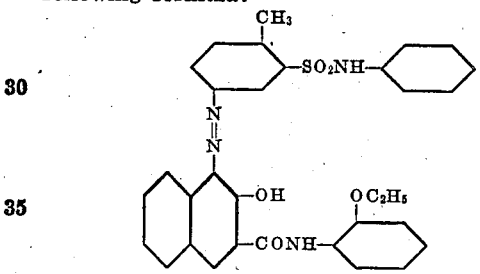

The dyestuff may also be developed at a temperature of 75° C.

An application of this process to regenerated cellulose and wool will also render level dyeings when the development is carried out at room temperature or at 75° C.

*Example 3.*—1 gr. of 1-amino-4-methyl-3-sulfanilido benzene and 1 gr. of 2-hydroxy-3-(3'-nitro benzene) carbonylamido naphthalene are dissolved in water with 5 cc. of ethyl alcohol, 5 cc. of monopol brilliant oil, 1 cc. of caustic soda solution of 40% by volume. This solution is brought to one liter with water and 25 grs. of Glauber's salt.

Acetate crepe silk is impregnated therewith by placing it in this solution for from one to three hours, at a temperature of from 60° to 70° C. The material is then rinsed and treated for twenty minutes in a bath containing 2 grs. of sodium nitrite and 5 cc. of concentrated hydrochloric acid per liter, whereupon the diazotization and the coupling are effected simultaneously. Thereafter, the dyeing is treated for a half hour with a soap solution (5 grs. of soap per liter) at 30° C. A yellowish-red is obtained which has the following formula:

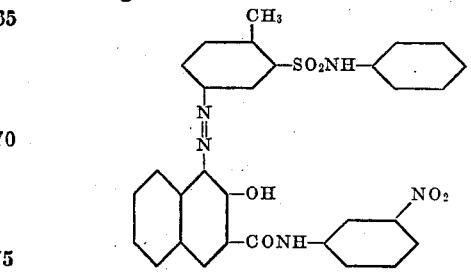

*Example 4.*—1 gr. of 1-amino-6-methoxy-3-methyl-sulfamido benzene and 1 gr. of 3-hydroxy-2-(2'.5'-dimethoxy benzene) carbonylamido diphenylene oxide are dissolved in water with 5 cc. of ethyl alcohol, 5 cc. of monopol brilliant oil and 1.5 cc. of caustic soda solution of 40% by volume. This solution is brought to one liter with water and 25 grs. of Glauber's salt.

10 grs. of acetate silk are impregnated with 300 cc. of this solution for one hour at a temperature of from 60° to 70° C. After a short rinsing, the material is treated in a bath containing 2 grs. of sodium nitrite and 5 cc. concentrated hydrochloric acid per liter, whereupon diazotization and a weak coupling action are effected. In order to complete the development, the material is treated for ten minutes at a temperature of 70° C. in a second bath containing 5 grs. of sodium acetate per liter. After treatment with a soap solution, a brown shade is obtained, the dyestuff having the following formula:

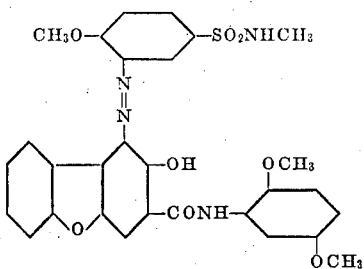

*Example 5.*—1 gr. of 1-methyl-2(2'-hydroxynaphthalene - 3' - carbonylamino) - 5 - methoxybenzene and 1 gr. of di(-4-methyl-3-aminobenzene-sulfonylamino)-ethane are dissolved in water with 5 cc. of alcohol, 5 cc. of monopol oil and 2.5 cc. of caustic soda solution (1:10). This solution is brought to one liter with water and 25 grs. of Glauber's salt.

By proceeding in the same manner as described in Example 4, acetate silk is dyed a full orange shade.

*Example 6.*—A printing paste is made up in a manner similar to that described in the preceding examples, with the following constituents:

| | |
|---|---|
| 1-amino- 6 -methoxy - 3 - methyl sulfamido benzene _____ grs__ | 2.5 |
| 2-hydroxy-3-(4'-chlorbenzene) carbonylamido carbazole _____ grs__ | 3.4 |
| Sodium nitrite _____ grs__ | 2.1 |
| Sodium acetate _____ grs__ | 0.4 |
| Turkey red oil _____ cc__ | 4.0 |
| Caustic soda solution of 40% by volume _____ cc__ | 4.0 |
| Neutral tragacanth _____ grs__ | 50.0 |

And a sufficient quantity of water to make a total weight of 100 grams. This printing paste may be printed upon wool, acetate silk or regenerated cellulose. After drying the material, it is treated with a solution containing 250 cc. of hydrochloric acid (22 Bé.), 500 grs. of tragacanth (65:1000), 10 cc. formaldehyde solution and a sufficient quantity of water to make a total weight of 1000 grams, aerated, and subsequently treated at a temperature of 50° C. in a bath containing 30 grs. of calcined soda per liter of water. The material is thereupon rinsed, treated with a soap solution, again rinsed and dried. A brown shade is obtained, the dyestuff having the following general formula:

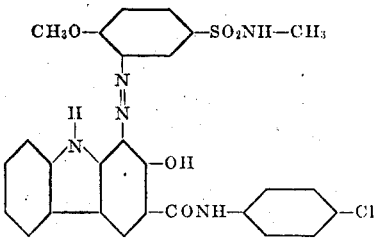

*Example 7.*—A printing paste is prepared in the manner described in Example 2, by employing 2.92 grs. of 1-amino-2-methyl-5-methoxy-4-sulfanilido benzene and 2.8 grs. of 2-hydroxy-3-(ortho-toluene) carbonylamido naphthalene. The paste may be printed upon wool, acetate silk and regenerated cellulose. The printed material is dried and treated at room temperature in a bath containing 7 grs. of sodium nitrite and 14 grs. of glacial acetic acid per liter, whereupon the diazotization of the base and the development of the dyestuff is effected. A red-violet shade is obtained, the dyestuff having the following formula:

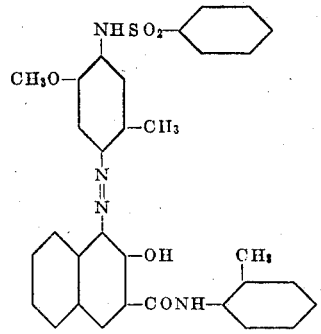

*Example 8.*—A printing paste is prepared in the manner described in Example 2 by employing 1.94 grs. of 1.4-diethoxy-2-amino-5-(2'-hydroxy-5'-chlorbenzene) carbonylamido benzene and 1.3 grs. of 2-hydroxy-3-carbonyl-anilido naphthalene. The paste may be printed upon wool, acetate silk, and regenerated cellulose. After drying the material, it is treated at room temperature in a bath containing 7 grs. of sodium nitrite and 14 grs. of glacial acetic acid per liter, whereupon the diazotization of the base and the development of the dyestuff are effected. A blue shade is obtained, the dyestuff having the following formula:

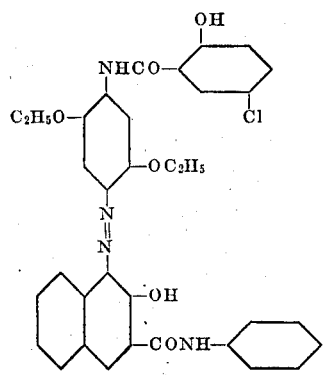

*Example 9.*—1.4 grs. of para-amino benzene sulfo-ortho-anisidid of the formula:

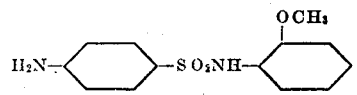

and 1.47 grs. of Naphthol-AS-OL are dissolved, made into a printing paste, printed and developed as in Example 1. A clear scarlet shade is produced.

*Example 10.*—1.5 grs. of 1-amino-naphthalene-4-sulfanilid of the formula:

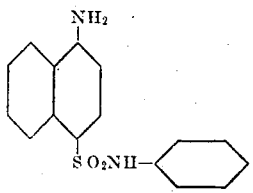

and 1.39 grs. of Naphthol-AS-D are dissolved, made into a printing paste, printed and developed as in Example 1. A deep clear bluish-red shade is obtained.

If the development is carried out at a temperature of from 70° to 80° C., the full shade is developed immediately.

*Example 11.*—1.46 grs. of 1-para-toluol-sulfonylamido-2-methoxy-4-amino benzene of the formula:

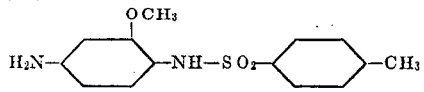

and 1.32 grs. of Naphthol-AS are dissolved, made into a printing paste, printed and developed as in Example 1. A strong reddish-brown shade is obtained.

*Example 12.*—1.32 grs. of 4-amino-benzene sulfo-4'-amino-anilide of the formula:

and 1.32 grs. of Naphthol-AS are printed as in Example 1. A brilliant orange shade is obtained.

*Example 13.*—1.5 grs. of 4-amino-benzene-sulfo-α-naphthyl-amide of the formula:

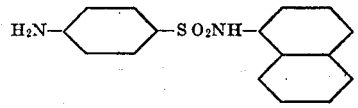

and 1.7 grs. of Naphthol-AS-LB are printed as in Example 1. A bright brown shade is obtained.

If 1.54 grs. of Naphthol-AS-PH are used instead, a deep reddish-brown shade is obtained.

*Example 14.*—1.31 grs. of 1-amino-4-methyl-benzene-3-sulfanilid of the formula:

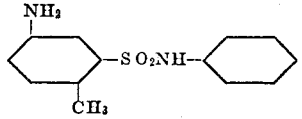

and 1.54 grs. of Naphthol-AS-PH are dissolved in 300 cc. of water, 3 cc. of caustic soda of 40% by volume, and 1 cc. of monopol oil. 10 grams of silk are immersed in this bath for twenty minutes at room temperature. The treated material is then subjected to a bath, containing 1% sodium nitrite and 2% glacial acetic acid, for about fifteen minutes at about room temperature, whereupon the diazotization and development of the dyestuff is effected. A scarlet shade is produced.

If the silk is dyed at a temperature of from 60° to 70° C. and then subjected to treatment in the nitrite acid bath at 70° to 80° C. instead of at room temperature, the dyestuff is developed and a shade of the same depth is obtained immediately.

*Example 15.*—1.31 grs. of 1-amino-4-methyl-benzene-3-sulfanilid and 1.7 grs. of Naphthol-AS-LB are dissolved as in Example 1 and the solution is diluted with water and cellosolve to make up 300 ccs. 10 grs. of cotton are immersed in this bath for fifteen minutes, the material is squeezed off, and the dyestuff is developed by treatment in a bath, containing 1% sodium nitrite and 2% glacial acetic acid, for from ten to fifteen minutes at room temperature. A yellowish-brown shade is obtained.

If the dyeing and developing is carried out at a temperature of from 70° to 80° C., a similar shade of equal depth is obtained in much less time.

If 10 grs. of rayon are dyed and developed as described above, a deep brown shade is obtained.

*Example 16.*—2.1 grs. of 1.4-disulfanilido-2-aminobenzene of the formula:

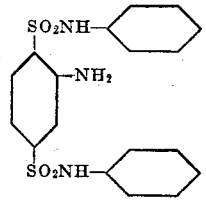

and 1.32 grs. of Naphthol-AS are printed and developed as described in Example 15. A clear orange shade is obtained.

Several further combinations are listed in the following table. The development of the dyestuffs takes place in the manner described in the examples.

| Base | Coupling component | Shade |
| --- | --- | --- |
| Para-amino-benzene sulfo-ortho-anisidid | 2-hydroxy-3-(2'-methoxy benzene) carbonylamido naphthalene. | Scarlet. |
| 3-amino-6-methyl benzene sulfanilide | β-naphthol | Orange. |
| Do | 2-hydroxy-3-carbonyl-anilido naphthalene | Red. |
| Do | 2-hydroxy-3-(4'-chloro-benzene) carbonylamido carbazole. | Yellow-brown. |
| 3-amino-4-methoxy benzene sulfo-methyl-amide. | 3.3'-dimethyl-4.4'-di-(acetoacetylamino) diphenylene. | Yellow. |
| Di-(4-methoxy-3-aminobenzene-sulfamido) ethane. | do | Do. |
| Do | 2-hydroxy-3-(2'.5'-di-methoxybenzene)-carbonylamido naphthalene. | Yellowish-red. |
| 4-amino-naphthalene-sulfanilide | 2-hydroxy-3-(ortho-toluene) carbonylamido naphthalene. | Bluish-red. |
| 4-aminobenzene sulfo-α-naphthyl-amide | 2-hydroxy-3-(4'-chloro-benzene) carbonylamido carbazole. | Brown. |
| 4-methylbenzene sulfo-4'-amino-2'-methoxy-anilide. | 2'-hydroxy-3'-naphthalene carbonylamido benzene. | Strong reddish-brown |

| Base | Coupling component | Shade |
|---|---|---|
| 4-methylbenzene sulfo-4'-amidoanilide | 2-hydroxy-3-(2-ethoxybenzene) carbonylamido naphthalene | Golden yellow. |
| 2-methoxy-4-amino-5-methyl benzene sulfanilide. | 2-hydroxy-3-(2'-methoxy-benzene) carbonylamido naphthalene. | Reddish Bordeaux. |
| Do | 2-hydroxy-3-(2'-methyl-4'-methoxybenzene) carbonylamido naphthalene. | Do. |
| 1-para-toluene-sulfonylamido-2-methyl-4-(meta-amino-para-methoxybenzoyl-amino)-5-acetyl benzene. | 2-hydroxy-3-(ortho-toluene) carbonylamido naphthalene. | Yellowish red. |
| 3-(para-amino benzoyl-amino)-6-methylbenzene sulfanilide. | 2-hydroxy-3-carbonyl-anilido naphthalene | Red. |
| 1-hydroxy-4-(2'-amino-benzoyl-methylamino)-benzene. | 2-hydroxy-3-(ortho-toluene) carbonylamido naphthalene. | Golden orange. |
| 1,4-diethoxy-2-amino-5-(2'-hydroxy-4'-methyl-benzoylamino)-benzene. | 2-hydroxy-3-carbonyl-anilido naphthalene | Blue. |
| 1-methoxy-2-(2'-hydroxy-3'-methylbenzoyl-amino)-4-phenoxy-5-amino benzene. | 2-hydroxy-3-(ortho-toluene) carbonylamido naphthalene. | Reddish-blue. |
| 1-methoxy-2-amino-4-phenoxy-5-(2'hydroxy-5' methylbenzoylamino)-benzene. | 2-hydroxy-3-(ortho-toluene) carbonylamido naphthalene. | Do. |
| 1,4-diethyl-2-amino-5-acetoacetylamino-benzene. | 2-hydroxy-3-(ortho-toluene) carbonylamido naphthalene. | Reddish-blue-black. |
| 1-(2',5'-dimethoxy-4'-aminobenzene sulfonyl-amino)-4-methoxybenzene. | do | Bluish-red. |
| Do | 2-hydroxy-3-(2'-methoxybenzene) carbonylamido naphthalene. | Red. |
| Di-(4-methyl-3-amino-benzenesulfonylamino) ethane. | 2-hydroxy-3-(4'-methoxybenzene) carbonylamido naphthalene. | Orange. |
| Do | 2-hydroxy-3-(2'.5'-dimethoxy-benzene) carbonylamido naphthalene. | Reddish-orange. |

I claim:

1. Process of dyeing fibrous material which comprises applying to the fibrous material aqueous alkaline solutions of both a diazotizable, water-insoluble aromatic amine containing in the molecule an alkali-solubilizing radical selected from the group consisting of $SO_2NH$, enolic hydroxy radicals and phenolic hydroxy radicals and a coupling component and then diazotizing said amine and coupling the diazotized amine with the coupling component while said compounds are in contact with the fibrous material, to thereby develop an azo dyestuff on the fibrous material.

2. Process of dyeing acetate material which comprises applying to the acetate material aqueous alkaline solutions of both a diazotizable, water-insoluble aromatic amine containing in the molecule an alkali-solubilizing radical selected from the group consisting of $SO_2NH$, enolic hydroxy radicals and phenolic hydroxy radicals and a coupling component and then diazotizing said amine and coupling the diazotized amine with the coupling component while said compounds are in contact with the acetate material, to thereby develop an azo dyestuff on the acetate material.

3. Process of printing textile material which comprises applying to said textile material a printing paste containing a diazotizable, water-insoluble aromatic amine containing in the molecule an alkali-solubilizing radical selected from the group consisting of $SO_2NH$, enolic hydroxy radicals and phenolic hydroxy radicals, a coupling component and an alkali, diazotizing said amine and coupling the diazotized amine with the coupling component while said compounds are in contact with the textile material, to thereby develop an azo dyestuff on the fibrous material.

4. Process of printing acetate material which comprises applying to said acetate material a printing paste containing a diazotizable, water-insoluble aromatic amine containing in the molecule an alkali-solubilizing radical selected from the group consisting of $SO_2NH$, enolic hydroxy radicals and phenolic hydroxy radicals, a coupling component and an alkali, diazotizing said amine and coupling the diazotized amine with the coupling component while said compounds are in contact with the acetate material, to thereby develop an azo dyestuff on the acetate material.

5. A printing paste comprising a diazotizable, water-insoluble aromatic base containing in the molecule an alkali-solubilizing radical selected from the group consisting of $SO_2NH$, enolic hydroxy radicals and phenolic hydroxy radicals, a coupling component and an alkali.

6. Process of dyeing fibrous material which comprises applying to the fibrous material aqueous alkaline solutions of both an alkali-soluble, water-insoluble diazotizable amino-sulfarylid and a coupling component and then diazotizing said sulfraylid and coupling the diazotized sulfarylid with the coupling component while said compounds are in contact with the fibrous material, to thereby develop an azo dyestuff on the fibrous material.

7. Process of dyeing acetate material which comprises applying to the acetate material aqueous alkaline solutions of both an alkali-soluble, water-insoluble diazotizable amino-sulfarylid and a coupling component and then diazotizing said sulfarylid and coupling the diazotized sulfarylid with the coupling component while said compounds are in contact with the acetate material, to thereby develop an azo dyestuff on the acetate material.

8. Process of printing textile material which comprises applying to said textile material a printing paste containing an alkali-soluble, water-insoluble diazotizable amino-sulfarylid, a coupling component and an alkali, diazotizing said sulfarylid and coupling the diazotized sulfarylid with the coupling component while said compounds are in contact with the textile material, to thereby develop an azo dyestuff on the fibrous material.

9. Process of printing acetate material which comprises applying to said acetate material a printing paste containing an alkali-soluble, water-insoluble diazotizable amino-sulfarylid, a coupling component and an alkali, diazotizing said sulfarylid and coupling the diazotized sulfarylid with the coupling component while said compounds are in contact with the acetate material, to thereby develop an azo dyestuff on the fibrous material.

10. A printing paste comprising an alkali-soluble, water-insoluble diazotizable amino-sulfarylid, a coupling component and an alkali.

11. Process of printing textile material which comprises applying to said textile material a printing paste containing an alkali-soluble, water-insoluble diazotizable amino-sulfarylid, a coupling component, an alkali-metal nitrite and an alkali, diazotizing said sulfarylid and coupling the diazotized sulfarylid with the coupling component while said compounds are in contact with the textile material, to thereby develop an azo dyestuff on the fibrous material.

12. A printing paste comprising an alkali-soluble, water-insoluble diazotizable amino-sulfarylid, a coupling component, an alkali-metal nitrite and an alkali.

WILLIAM H. von GLAHN.